(12) United States Patent
Willdig et al.

(10) Patent No.: US 9,260,177 B2
(45) Date of Patent: Feb. 16, 2016

(54) JOINT

(75) Inventors: Victor Willdig, Bristol (GB); Jon McAlinden, Bristol (GB)

(73) Assignee: AIRBUS OPERATIONS LIMITED, Bristol (GB)

(*) Notice: Subject to any disclaimer, the term of this patent is extended or adjusted under 35 U.S.C. 154(b) by 0 days.

(21) Appl. No.: 13/144,386

(22) PCT Filed: Jan. 21, 2010

(86) PCT No.: PCT/GB2010/050083
§ 371 (c)(1),
(2), (4) Date: Jul. 13, 2011

(87) PCT Pub. No.: WO2010/089578
PCT Pub. Date: Aug. 12, 2010

(65) Prior Publication Data
US 2011/0271509 A1 Nov. 10, 2011

(30) Foreign Application Priority Data
Feb. 3, 2009 (GB) .................................. 0901640.3

(51) Int. Cl.
*B23P 11/00* (2006.01)
*B23P 17/00* (2006.01)
(Continued)

(52) U.S. Cl.
CPC ... *B64C 3/28* (2013.01); *B64C 3/26* (2013.01); *F16B 5/0084* (2013.01); *Y10T 29/49826* (2015.01); *Y10T 403/635* (2015.01)

(58) Field of Classification Search
CPC ............ F16B 7/18; F16B 2/14; F16B 5/0004; F16B 1/00; F16B 5/00; F16C 15/00; B65G 21/20; A47B 96/06; B29C 65/00; B16B 21/18; F16D 1/00; B25G 3/00; B23P 11/00; B23P 19/04; B64C 1/12; B64C 1/06; B64C 3/00; B64C 5/00; B64C 1/068; B64C 7/00; B64C 1/00; B64C 3/48

USPC ............... 29/428, 434, 525.01; 403/300, 306, 403/339, 340, 375, 408.1, 409.1, DIG. 15; 244/119, 120, 131, 132, 123.1, 124
See application file for complete search history.

(56) References Cited

U.S. PATENT DOCUMENTS 36,812 A * 10/1862 Twining ......................... 403/283
3,879,916 A * 4/1975 Bigham ........................... 52/463
(Continued)

FOREIGN PATENT DOCUMENTS

DE 704327 C 3/1941
DE 202005013345 U 2/2007
(Continued)

OTHER PUBLICATIONS

English Translation of DE 704,327, machine translated.*
(Continued)

*Primary Examiner* — Essama Omgba
*Assistant Examiner* — Darrell C Ford
(74) *Attorney, Agent, or Firm* — Hauptman Ham, LLP

(57) ABSTRACT

A joint comprising first and second abutting components, and an adjustable strap assembly bridging the abutting components, the strap assembly including a first strap part attached to one of the components, and a second strap part attached to the other component, the first and second strap parts having mating inclined faces for adjustment of the second strap part with respect to the first strap part such that the position of the second strap part is adjustable with respect to the first strap part in the direction of the incline. Also, a method of forming the joint, comprising attaching the first strap part to the first component, providing the second strap part such that the inclined faces of the first and second strap parts are in mating engagement, adjusting the second strap part with respect to the first strap part in the direction of the incline to position the second strap part in a desired relationship with respect to the first strap part, and attaching the second strap part to the second component.

18 Claims, 5 Drawing Sheets

(51) Int. Cl.

| | | |
|---|---|---|
| *B64C 1/00* | (2006.01) | |
| *B64C 3/00* | (2006.01) | |
| *B64C 5/00* | (2006.01) | |
| *B64C 1/06* | (2006.01) | |
| *B66C 1/12* | (2006.01) | |
| *F16B 2/14* | (2006.01) | |
| *B64C 3/28* | (2006.01) | |
| *B64C 3/26* | (2006.01) | |
| *F16B 5/00* | (2006.01) | |

(56) References Cited

U.S. PATENT DOCUMENTS

| | | | | |
|---|---|---|---|---|
| 4,344,591 | A * | 8/1982 | Jackson | 244/159.1 |
| 4,520,364 | A * | 5/1985 | Perry | 343/872 |
| 4,789,349 | A * | 12/1988 | Parmer | 439/161 |
| 5,673,631 | A * | 10/1997 | Guns et al. | 108/64 |
| 6,551,158 | B2 * | 4/2003 | Murphy | 441/72 |
| 6,702,232 | B2 * | 3/2004 | Dovey et al. | 244/129.4 |
| 8,393,578 | B2 * | 3/2013 | Parikh et al. | 244/132 |
| 8,398,027 | B2 * | 3/2013 | Wood | 244/131 |
| 8,444,090 | B2 * | 5/2013 | Reye et al. | 244/119 |
| 8,584,986 | B2 * | 11/2013 | Pina Lopez et al. | 244/119 |
| 8,870,120 | B2 * | 10/2014 | Sanderson et al. | 244/123.3 |
| 8,898,901 | B2 * | 12/2014 | Richter et al. | 29/889.71 |
| 2006/0248854 | A1 * | 11/2006 | Bartley-Cho et al. | 52/782.1 |
| 2008/0164376 | A1 | 7/2008 | Kato et al. | |
| 2008/0258008 | A1 * | 10/2008 | Cooper | 244/131 |
| 2009/0148647 | A1 * | 6/2009 | Jones et al. | 428/58 |
| 2009/0217594 | A1 * | 9/2009 | Gill et al. | 49/410 |
| 2009/0236473 | A1 * | 9/2009 | Rawdon et al. | 244/120 |
| 2009/0266870 | A1 * | 10/2009 | Yousefiani et al. | 228/112.1 |
| 2009/0294589 | A1 * | 12/2009 | Berry et al. | 244/123.1 |
| 2010/0320322 | A1 * | 12/2010 | Reye et al. | 244/120 |
| 2014/0356057 | A1 * | 12/2014 | Griess et al. | 403/291 |
| 2015/0093185 | A1 * | 4/2015 | Nonaka et al. | 403/267 |
| 2015/0175250 | A1 * | 6/2015 | Deobald | B29D 99/0014 428/120 |

FOREIGN PATENT DOCUMENTS

| | | |
|---|---|---|
| JP | 56-143454 U | 10/1981 |
| JP | 3-71038 U | 7/1991 |
| JP | 08-256861 A | 10/1996 |
| JP | 09-060102 A | 3/1997 |
| JP | 3086357 U | 3/2002 |
| JP | 2004-245399 A | 9/2004 |
| SU | 1 707 317 A1 | 1/1992 |
| SU | 1812346 A1 | 4/1993 |
| WO | 2007/071905 A1 | 6/2007 |

OTHER PUBLICATIONS

United Kingdom Search Report dated May 18, 2009.
International Search Report for PCT/GB2010/050083 mailed Mar. 25, 2010.
Russian Office Action for 2011134453/11(051069), dated Dec. 24, 2013.
JP Application No. 2011-548777, Office Action issued Jan. 7, 2014.
Russian Patent Application No. 2011134453/11, Granting Decision dated May 29, 2014.

* cited by examiner

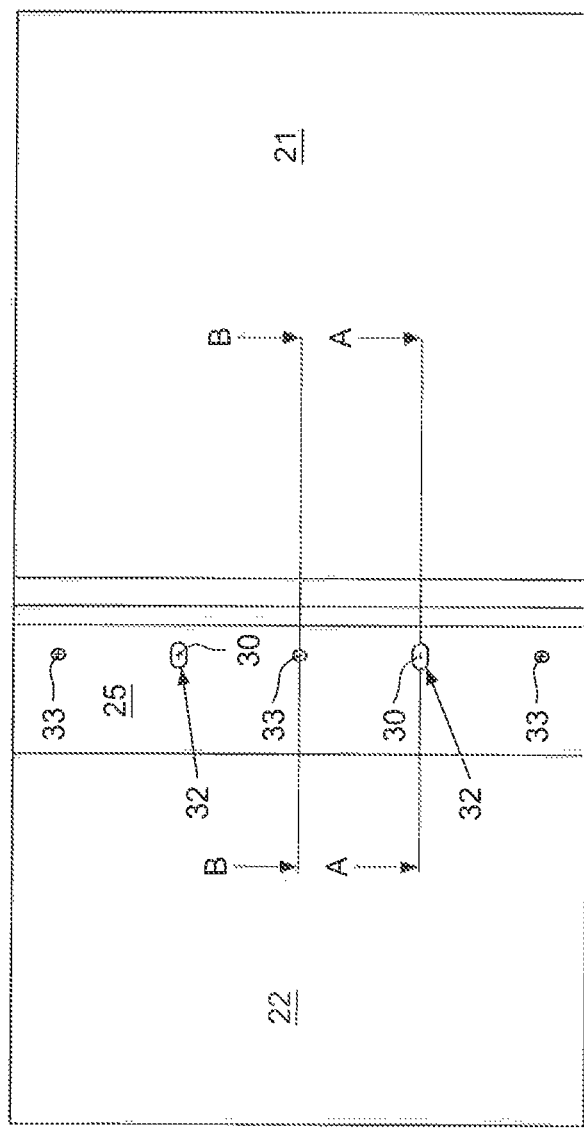
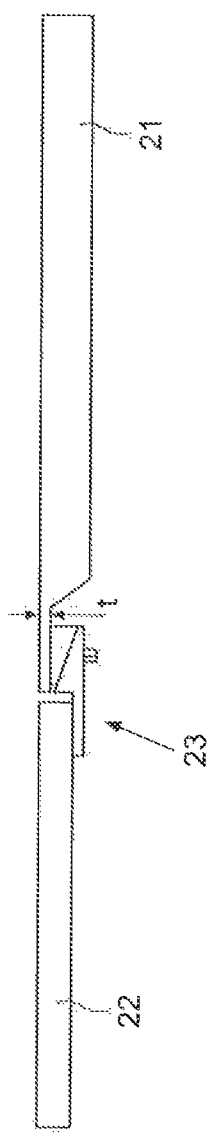
FIG. 4
FIG. 5

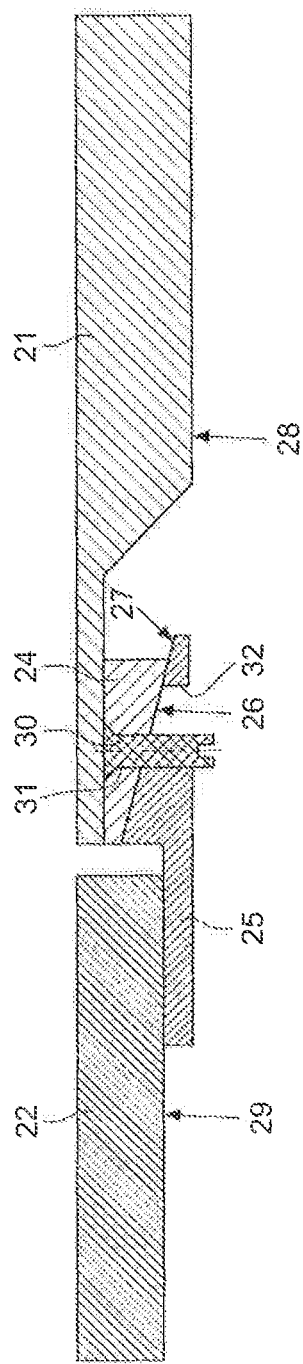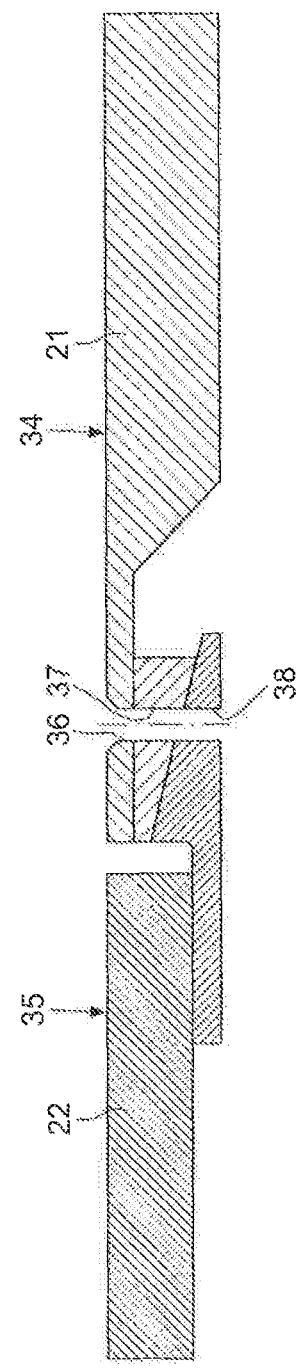

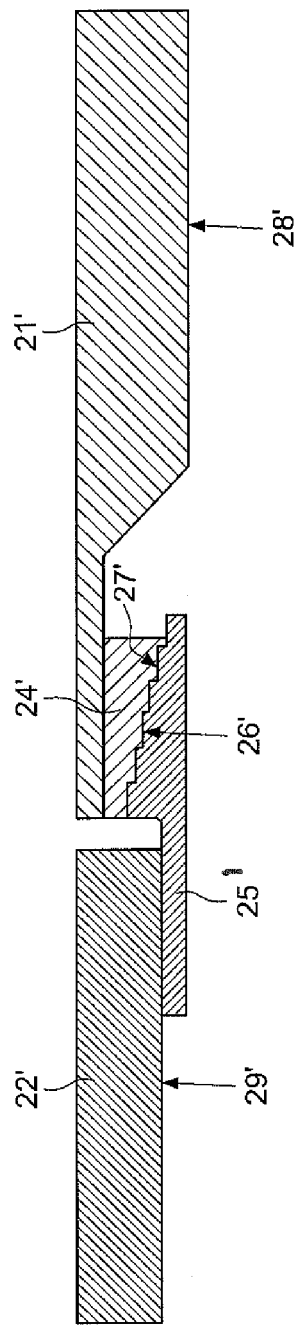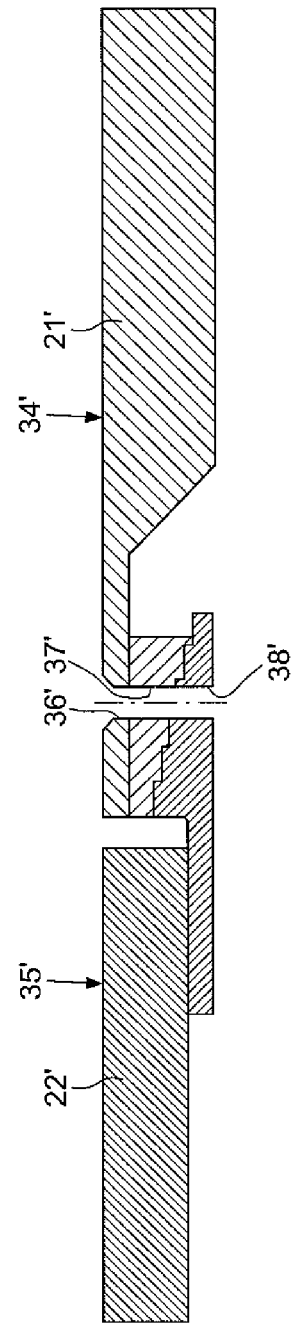

JOINT

RELATED APPLICATIONS

The present application is a National Phase of International Application Number PCT/GB2010/050083, filed Jan. 21, 2010, and claims priority from, British Application Number 0901640.3, filed Feb. 3, 2009.

FIELD OF THE INVENTION

The present invention relates to a joint between two abutting components. The invention also relates to a method of forming such a joint.

BACKGROUND OF THE INVENTION

Conventional aircraft wings comprise a wing box with front and rear spars. Upper and lower wing covers are attached to the spars and extend between them to form the upper and lower boundaries of the wing box. Leading and trailing edge structures, such as panels or D-nose covers, are typically attached to the upper and lower covers with buttstraps. FIGS. 1 and 2 illustrate conventional butt-strap arrangements.

An upper wing cover 1 is attached to a fixed leading edge structure 2 with a butt-strap 3, a pair of bolts 4, 5 and nuts 9, 10. The butt-strap 3 comprises upper and lower horizontal portions 7, 6 which are joined by a vertical portion 8. The lower portion 6 engages with the internal surface of the cover 1, while the upper portion 7 engages with the internal surface of the fixed leading edge structure 2.

To achieve a smooth aerodynamic surface, the external surface of the structure 2 and the external surface of the cover 1 must be aligned with each other within a strict tolerance range. Outside of this range, the step created in the external surface across the joint leads to drag and increased fuel burn, and also issues with erosion of the edge of the structure 2. To ensure that the alignment criteria are met, a packer 12 may be added between the internal surface of the structure 2 and the upper portion 7 of the butt-strap, as shown in FIG. 1. Alternatively, as shown in FIG. 2, a packer 11 may be added between the internal surface of the cover 1 and the lower portion 6 of the butt-strap. However, as the butt-straps 3 are typically fitted in various strips across the whole span of the wing, this process can be difficult and time consuming. It may also be necessary to hand fettle the structure 2 to match the cover 1 during assembly. This adds further complexity to the process.

The problems with conventional butt-straps are particularly evident when used to join composite components, which typically have higher dimensional tolerance than their metallic counterparts.

SUMMARY OF THE INVENTION

A first aspect of the invention provides a joint comprising first and second abutting components, and an adjustable strap assembly bridging the abutting components, the strap assembly including a first strap part attached to one of the components, and a second strap part attached to the other component, the first and second strap parts having mating inclined faces for adjustment of the second strap part with respect to the first strap part such that the position of the second strap part is adjustable with respect to the first strap part in the direction of the incline.

A second aspect of the invention provides a method of forming a joint according to the first aspect, the method comprising attaching the first strap part to the first component, providing the second strap part such that the inclined faces of the first and second strap parts are in mating engagement, adjusting the second strap part with respect to the first strap part in the direction of the incline to position the second strap part in a desired relationship with respect to the first strap part, and attaching the second strap part to the second component.

The present invention is advantageous in that the two-part strap assembly is adjustable such that it may be used to bridge a variety of abutting components, without the need for the strap assembly to be a bespoke part or for any additional packing materials or shim etc. This reduces part count and can decrease assembly time.

The second strap part may be attached to the second component either before or after the relative position of the second strap part is adjusted.

The mating inclined surfaces may be planar and smooth so that the second strap part can be slidably adjusted with respect to the first strap part in the direction of the incline. However, the mating inclined faces need not be smooth but instead may have treated surfaces to increase their surface roughness so as to ensure positive engagement between the first and second strap parts to prevent sliding following the adjustment. The relative position of the first and second strap parts may then be easily set. The surface roughness may be achieved by, e.g. shot blasting.

The mating inclined surfaces need not be planar and instead may have co-operating serrations. The serrations may be of relatively small height so as to be of similar dimension to the surface roughness formed by, e.g. shot blasting described above.

In each of the above configurations of the mating faces, the strap parts may be slidably adjusted to virtually any relative position along the incline. However, where it is desired to adjust the position of the strap parts between only a few discrete positions, the inclined faces may have mating serrations of significant height. The strap parts would then not be slidably adjustable, but would provide positive engagement between the strap parts in the discrete positions. Adjustment may be effected by bringing the mating serrations out of engagement, relative translating movement of the strap parts in the direction of the incline, and bringing the mating serrations back into engagement.

The serrations may take virtually any form. For example, the serrations may have a stepped or saw-tooth configuration. Regardless of their height, the serrations may either be integrally formed on the first and second strap parts, or formed on separate parts joined to the first and second strap parts. The latter would simplify manufacture of the strap parts and reduce costs, and could allow common parts to be made. The separate parts having the serrations may be joined to the strap parts by riveting, adhesive bonding or other fixing means.

The adjustable strap assembly may include a setting device for setting the relative position of the first and second strap parts. This is particularly advantageous where the strap arts are slidably adjustable. The setting device is preferably releasable to permit adjustment of the second strap part with respect to the first strap part. In a preferred embodiment, the setting device is one or more bolts received in respective elongate slots formed in the first strap part. The bolt(s) may be loosened to permit the sliding adjustment. The sliding adjustment is accommodated by movement of the bolt within its slot. Where the strap parts are not slidably adjustable, the engagement between the mating serrations may be sufficient to set the position of the strap parts without a further setting device.

The abutting components preferably have respective external surfaces. These may be, for example, aerodynamic surfaces of aircraft components. The abutting components may be panel members. In a preferred embodiment, the first component is a wing trailing edge panel and the second component is a wing cover. The joint of the present invention enables these external surfaces of the abutting components to be set substantially flush, if desired. The adjustable strap assembly may be attached to internal surfaces of the first and second components. The angle of inclination of the inclined faces of the strap parts would, in this case, be with respect to the external surfaces of the abutting components.

In the case where the second strap part is attached to the second component after the position of the second strap part has been adjusted, then the relative position of the first and second strap parts may be set prior to attachment of the second strap part to the second component. In this way, the setting device may be concealed beneath the second component in the completed joint. Optionally, the relative positions of the first and second strap parts may be permanently set so that in the finished joint no further adjustment is possible.

The invention is particularly advantageous when one or both of the abutting components are made of composite material. For example, the thickness tolerance of composite panels used in aircraft may be as high as ±5%. Such panels have a thickness of the order of around 5 mm. By contrast, the step tolerance between aerodynamic surfaces of abutting panels on an aircraft may need to be of the order of around ±0.5 mm (depending on aerodynamic requirements). By introducing an adjustment in the strap assembly in the panel thickness direction, it is possible to take up the greater tolerances seen on the composite cover and achieve the stringent aerodynamic step tolerance requirements.

The first and second strap parts are typically elongated with their lengths extending along the abutting edges, although this is not essential. That is, the strap parts may not be elongated, or may have their lengths extending transverse to the abutting edges.

BRIEF DESCRIPTION OF THE DRAWINGS

Embodiments of the invention will now be described with reference to the accompanying drawings, in which:

FIG. 4 illustrates the joint of FIG. 3 viewed from beneath;
FIG. 5 illustrates the joint of FIG. 3 in side view;
FIG. 6 illustrates the section cut A-A in FIG. 4;
FIG. 7 illustrates the section cut B-B in FIG. 4;
FIG. 8 illustrates a section cut similar to FIG. 6 through an alternative joint;
and
FIG. 9 illustrates a section cut similar to FIG. 7 through the alternative joint.

DETAILED DESCRIPTION OF EMBODIMENTS

Figure 1:
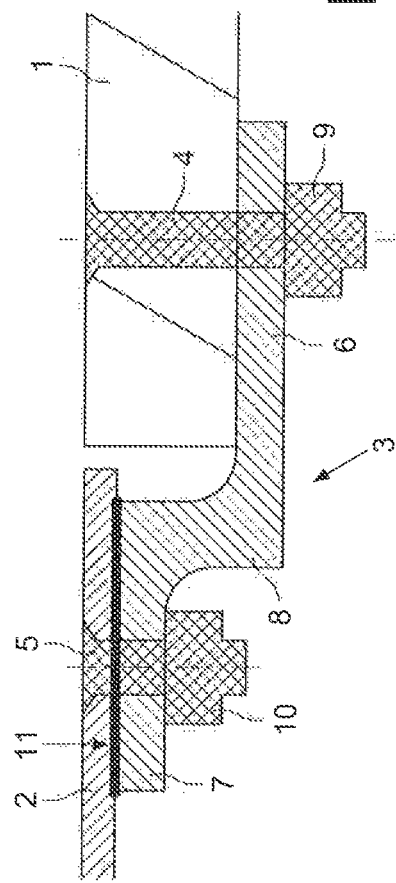
FIGS. 1 and 2 illustrate conventional butt-strap arrangements.
Figure 2:
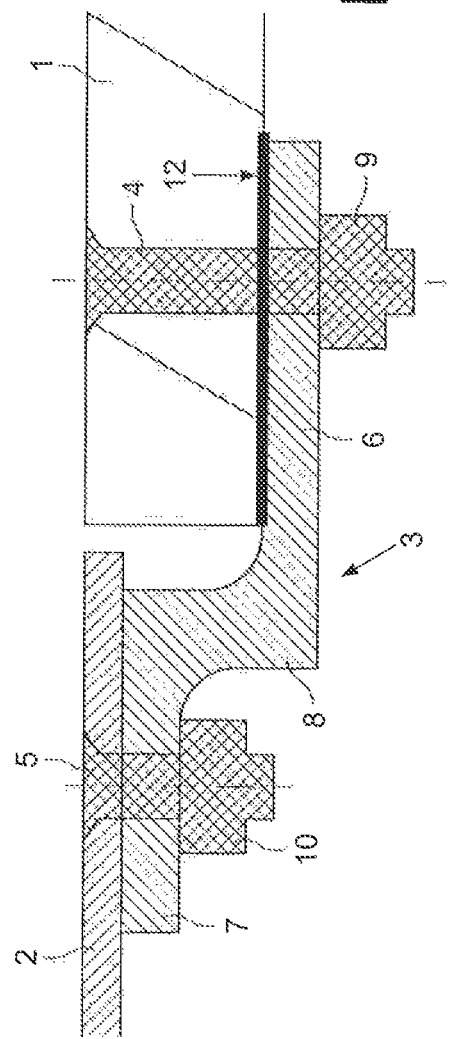

Turning now to FIGS. 3 to 7, there is shown a joint between an aircraft wing trailing edge panel 21 (the first component) and an aircraft wing box cover 22 (the second component). The joint may be on the upper or lower wing surface. The panel 21 and cover 22 are joined by an adjustable strap assembly 23. The strap assembly 23 comprises a first strap part 24 and a second strap part 25, each extending along the abutting edges of the panel 21 and cover 22.

The first and second strap parts 24,25 have mating inclined faces 26,27. The inclined mating faces 26,27 have serrations of relatively small dimension (approximately 0.1 to 2 mm) machined integrally into the first and second strap parts 24,25. The dimension of the serrations is approximately matched to the desired aerodynamic tolerance of the joint. The first strap part 24 has a generally wedge shaped cross-section. The second strap part 25 has a generally wedge shaped portion and an extending flange portion in cross-section. The inclined mating faces 26,27 form an angle of around 30 degrees with an external surface 34 of the panel 21, although this angle can be varied by design to provide a higher or lower range of angles as required.

The panel 21 also has an internal surface 28. The panel 21 has a taper portion in the vicinity of the joint, so the first and second strap parts 24,25 may be accommodated within the taper portion. The panel 21 has a sandwich construction with laminated composite outer plies of carbon fibre reinforced plastic sandwiching a core layer. The cover 22 has an internal surface 29 and an external surface 35. The cover 22 is made of composite material, such as carbon-fibre reinforced plastic.

The flange portion of the second strap part 25 is fixed to the internal surface 29 of the cover 22 by bolts (not shown). The first and second strap parts 24,25 are set in position by slave bolts 30. Each slave bolt 30 is received in a countersunk bore 31 in the first strap part 24, and an elongate slotted hole 32 in the second strap part 25. The upper surface of the first strap part 24 bears against the internal surface 28 of the panel 21. The first and second strap parts 24,25 are fixed to the panel 21 by bolts 33 (not shown in FIG. 7). Each bolt 33 is received in a countersunk bore 36 in the panel 21, a through bore 37 in the first strap part 24 and a through bore 38 in the second strap part 25. An external surface 35 of the cover 22 lies substantially flush with the external surface 34 of the panel 21. A gap between the edges of the panel 21 and the cover 22 allows for edge tolerances of the panel and/or cover and positional tolerances of the strap assembly 23.

The joint is assembled as follows. The first and second strap parts 24,25 are provided held together by the slave bolts 30 (2 slave bolt positions are shown in FIG. 4) in their aligned, pre-drilled countersunk bores 31 and slotted holes 32. In a first operation, the flange portion of the second strap part 25 is fastened to the cover 22 using bolts (not shown) via a single row of pre-drilled holes (not shown) in the flange portion of the second strap part 25 which will be matched to an identical row of pre-drilled holes (not shown) in the cover 22.

Then, in a second operation the slave bolts 30 are loosened off. When the slave bolts 30 are loose, the first strap part 24 will be free to slide relative to the second strap part 25 up and down the inclined face 26. During this movement, the countersunk slave bolts 30 move with the first strap part 24 as they are seated in their countersunk bores 31, but are free to move in their slotted holes 32. By sliding the first strap part 24 up and down the inclined face 26, the height of the first strap part 24 is adjusted in relation to the second strap part in a direction normal to the external surfaces 34,35 of the first and second strap parts 24,25. By adjusting the height in this way a step between the upper surface of the first strap part 24 and the cover 22 can be set accurately to a specific dimension. The dimension set is based on the known thickness "t" of the mating panel 21 such that when the panel is attached to the first strap part 24, the external surfaces 34,35 of the panel 21 and cover 22 are substantially flush. Any step between the external surfaces 34 and 35 would have to be within aerodynamic step tolerance requirements. The countersunk slave bolts 30 are then tightened to set the height of the first strap part 24 with respect to the second strap part 25. Note that even when tightened, the slave bolts 30 only act to set the relative position of the strap parts 24,25 and support substantially no load.

Figure 3:
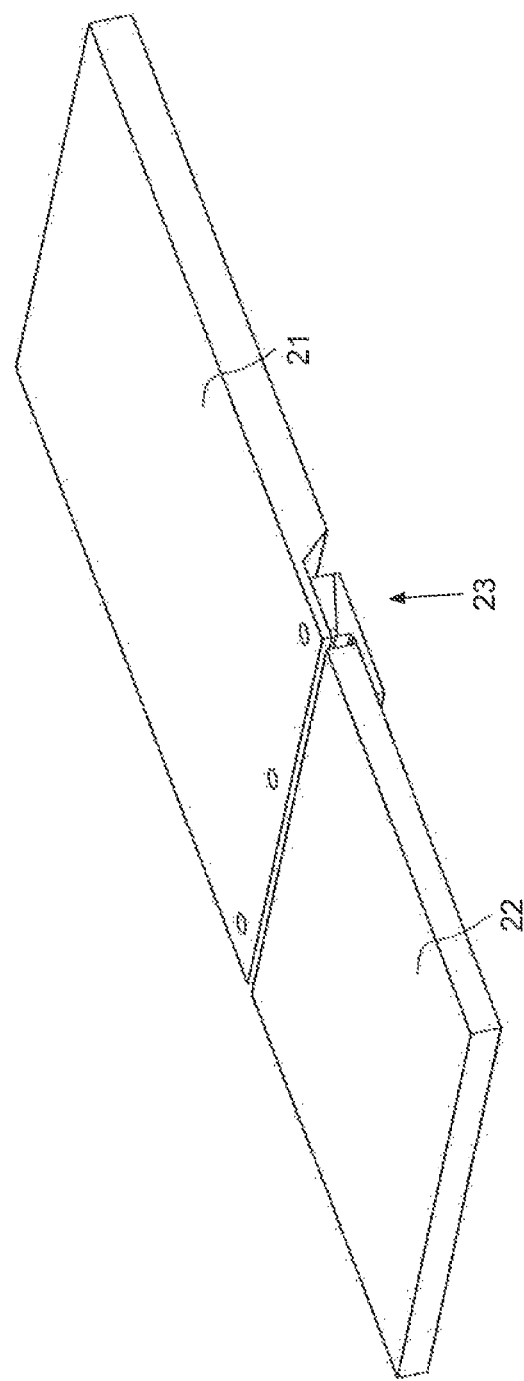
FIG. 3 illustrates a joint including the strap assembly in isometric view.

Then, in a third and final operation, holes (3 hole positions are shown in FIG. 3) are drilled off through the panel 21 (countersunk bore 36), the first strap part 4 (through bore 37) and the second strap part 25 (through bore 38) and the panel 21 is fastened to the first strap part 24 by bolts 33 (not shown in FIG. 7). The bolts 33 support the load transfer from the panel 21 to the strap assembly 23, whereas the slave bolts 30 support substantially no load.

A joint in accordance with an alternative embodiment is shown in FIGS. 8 and 9. Similar parts to those of the embodiment described above are denoted by identical reference numerals but with a prime (e.g., panel 21', cover 22', internal surface 28' of panel 21', internal surface 29' of cover 22', external surface 34' of panel 21', external surface 35' of cover 22' and through bore 38'). The strap assembly of this alternative joint differs from the strap assembly of the above described joint only in that the mating inclined faces 26',27' have serrations of relatively large dimension and in that the slave bolts 30, bores 31 and slotted holes 32 are omitted.

The serrations effectively form an inclined staircase of steps on the mating faces. The steps can be a few millimeters in height. Six such steps are shown in FIGS. 8 and 9, providing six discrete positions between which the strap assembly can be adjusted. However, a greater or fewer number of steps may be provided. The greater dimension of the serrations in this alternative embodiment ensures a more positive engagement between the strap parts 24',25' such that no setting device (the slave bolts 30, bores 31 and slotted holes 32) is required. However, a setting device may be provided where necessary.

Adjustment may be effected by bringing the mating serrations out of engagement, relative translating movement of the strap parts 24',25' in the direction of the incline, and bringing the mating serrations back into engagement. With the exception of the different adjustment action and the absence of a setting device, the alternative joint is formed in the same way to the joint described previously.

Whilst in the preferred embodiments described above the angled mating faces of the strap parts have serrations machined integrally into the strap parts, the serrations could alternatively be produced as a separate part to simplify manufacture and reduce costs. This could allow common parts to be made. The separate serrated parts could be joined to the strap parts using rivets or similar. Furthermore, as an alternative to using serrations of small dimension for providing a positive engagement, the two strap parts could have treated mating surfaces which increases the friction, such as by 'shot blasting'.

Although in the embodiments described above the joints are between an aircraft wing cover and trailing edge panel, the joints could be between any abutting components in an aircraft or any other structure. For example, the joints could be between a building structure and a panel. In the latter case, the serrations could have a height of a few millimeters, or even a centimeter or more, where the tolerance requirements are less stringent.

The number, size and type of fasteners used in the joints described above will vary according to the joint and the embodiment described above is in no way limiting in this regard.

The materials of the abutting components may differ from those of the embodiments described above, and may instead be metallic, such as Aluminium or Titanium, or other composite materials, such as Kevlar™ or glass fibre reinforced plastic.

Although the invention has been described above with reference to one or more preferred embodiments, it will be appreciated that various changes or modifications may be made without departing from the scope of the invention as defined in the appended claims.

The invention claimed is:

1. A joint comprising first and second abutting components, wherein edges of the first and second components are in abutment, and an adjustable strap assembly bridging the abutting components, the strap assembly including a first strap part attached to one of the components, the first strap having a generally wedge shaped cross-section and a second strap part attached to the other component, the second strap having a generally wedge shaped cross-section and an extending flange portion in cross-section through which the second strap part is attached to the other component, the generally wedge shaped cross-section of the first and second strap parts defining mating inclined faces for adjustment of the second strap part with respect to the first strap part such that the position of the second strap part is adjustable with respect to the first strap part in the direction of the incline, wherein the first and second components have respective external surfaces, wherein the external surfaces of the first and second components are substantially flush and provide an aerodynamic surface, wherein the adjustable strap assembly is located on a reverse side of the first and second components and the first and second strap parts do not form part of the aerodynamic surface.

2. A joint according to claim 1, wherein the mating inclined faces have treated surfaces to increase their surface roughness.

3. A joint according to claim 1, wherein the mating inclined faces have co-operating serrations.

4. A joint according to claim 3, wherein the serrations are one selected from the group comprising a) serrations integrally formed on the first and second strap parts, and b) serrations formed on separate parts joined to the first and second strap parts.

5. A joint according to claim 1, wherein the adjustable strap assembly further includes a setting device for setting the relative position of the first and second strap parts.

6. A joint according to claim 5, wherein the setting device is releasable to permit adjustment of the second strap part with respect to the first strap part.

7. A joint according to claim 6, wherein the setting device is at least one bolt received in respective elongate slots formed in the first strap part.

8. A joint according to claim 1, wherein the abutting components are panels.

9. A joint according to claim 1, wherein the components are aircraft components, and the external surfaces form aerodynamic surfaces of the aircraft.

10. A joint according to claim 9, wherein the first component is a wing trailing edge panel and the second component is a wing cover.

11. A joint according to claim 1, wherein the adjustable strap assembly is attached to internal surfaces of the first and second components.

12. A method of forming a joint according to claim 1, the method comprising attaching the first strap part to the first component, providing the second strap part such that the inclined faces of the first and second strap parts are in mating engagement, adjusting the second strap part with respect to the first strap part in the direction of the incline to position the second strap part in a desired relationship with respect to the first strap part, and attaching the second strap part to the second component.

13. A method according to claim 12, further comprising setting the relative position of the first and second strap parts prior to attachment of the second strap part to the second component.

14. A method according to claim 13, further comprising setting the relative position of the first and second strap parts such that external surfaces of the abutting components are substantially flush.

15. A joint according to claim 1, wherein the external surface of the first component extends up to the edge of the first component, and the external surface of the second component extends up to the edge of the second component.

16. A method of forming a joint comprising first and second abutting components, and an adjustable strap assembly bridging the abutting components, the strap assembly including a first strap part attached to one of the components, and a second strap part attached to the other component, the second strap having a generally wedge shaped cross-section and an extending flange portion in cross-section through which the second strap part is attached to the other component, the first and second strap parts having mating inclined faces for adjustment of the second strap part with respect to the first strap part such that the position of the second strap part is adjustable with respect to the first strap part in the direction of the incline; the method comprising the steps of:

a) attaching the first strap part to the first component,
b) providing the second strap part such that the inclined faces of the first and second strap parts are in mating engagement,
c) adjusting the second strap part with respect to the first strap part in the direction of the incline to position the second strap part in a desired relationship with respect to the first strap part,
d) setting the relative position of the first and second strap parts in a desired position selected from a plurality of different possible relative positions in which the first and second strap parts may be set in the finally assembled joint, and
e) attaching the second strap part to the second component once the first and second strap parts are in the desired position.

17. A method according to claim 16, wherein the desired relative position of the first and second strap parts is selected from the plurality of different possible relative positions based on a known thickness of the second component.

18. A method according to claim 16, wherein the first and second components have respective external surfaces, and attaching the second strap part to the second component brings the external surfaces of the first and second components substantially flush, and the external surfaces of the first and second components extend up to the abutting edges of the first and second components.

* * * * *